US011232588B2

(12) United States Patent
Nishikawa et al.

(10) Patent No.: US 11,232,588 B2
(45) Date of Patent: Jan. 25, 2022

(54) INFORMATION PROCESSING APPARATUS AND DEVICE INFORMATION DERIVATION METHOD

(71) Applicant: Sony Interactive Entertainment Inc., Tokyo (JP)

(72) Inventors: Kenzo Nishikawa, Tokyo (JP); Takanori Minamino, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 43 days.

(21) Appl. No.: 16/846,947

(22) Filed: Apr. 13, 2020

(65) Prior Publication Data
US 2020/0342621 A1    Oct. 29, 2020

(30) Foreign Application Priority Data

Apr. 24, 2019 (JP) .............................. JP2019-083058

(51) Int. Cl.
*G06K 9/00* (2006.01)
*G06T 7/73* (2017.01)

(52) U.S. Cl.
CPC ............ *G06T 7/73* (2017.01); *G06K 9/00342* (2013.01); *G06K 9/00355* (2013.01); *G06T 2207/30204* (2013.01)

(58) Field of Classification Search
CPC ............ G06T 7/73; G06T 2207/30204; G06K 9/00342; G06K 9/00355
See application file for complete search history.

(56) References Cited

U.S. PATENT DOCUMENTS

2019/0337641 A1* 11/2019 Blanton ............... G06K 9/0063

FOREIGN PATENT DOCUMENTS

JP    2007-296248 A    11/2007

OTHER PUBLICATIONS

Kato et al, "Marker Tracking and HMD Calibration for a Video-based Augmented Reality Conferencing System", 1999, Proceedings 2nd IEEE and ACM International Workshop on Augmented Reality (IWAR'99), 10 pages (Year: 1999).*

* cited by examiner

*Primary Examiner* — David F Dunphy
(74) *Attorney, Agent, or Firm* — Katten Muchin Rosenman LLP

(57) ABSTRACT

An information processing apparatus includes a captured image acquisition unit configured to acquire an image captured by imaging a device that includes a plurality of markers, and an estimation processing unit configured to estimate position information and posture information of the device on the basis of a marker image coordinate in the captured image. The estimation processing unit includes an extraction unit configured to extract N marker image coordinates in the captured image, N being an integer equal to or greater than three, and a position and posture derivation unit configured to derive the position information and the posture information of the device from the extracted N marker image coordinates and three-dimensional coordinates of N markers in a three-dimensional model of the device. The extraction unit extracts, where selected N+A marker image coordinates have a predetermined positional relation, N marker image coordinates from among the N+A marker image coordinates, A being an integer equal to or greater than one.

7 Claims, 11 Drawing Sheets

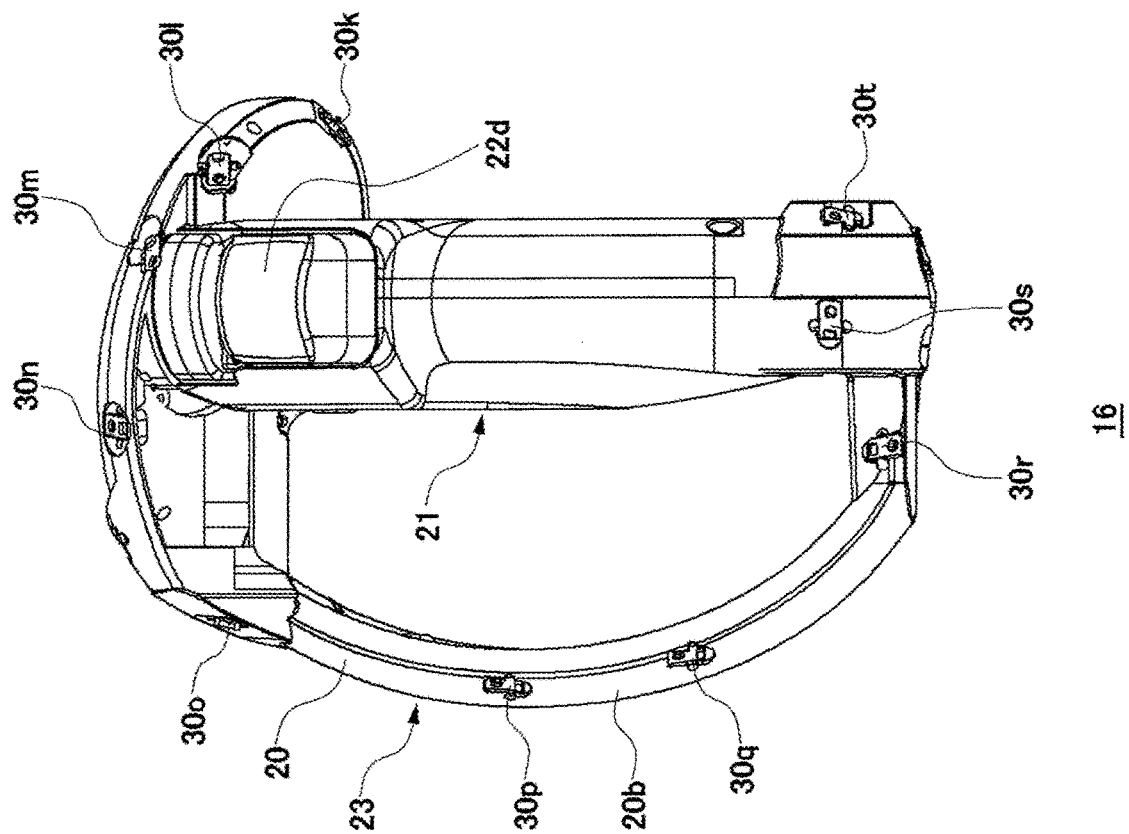
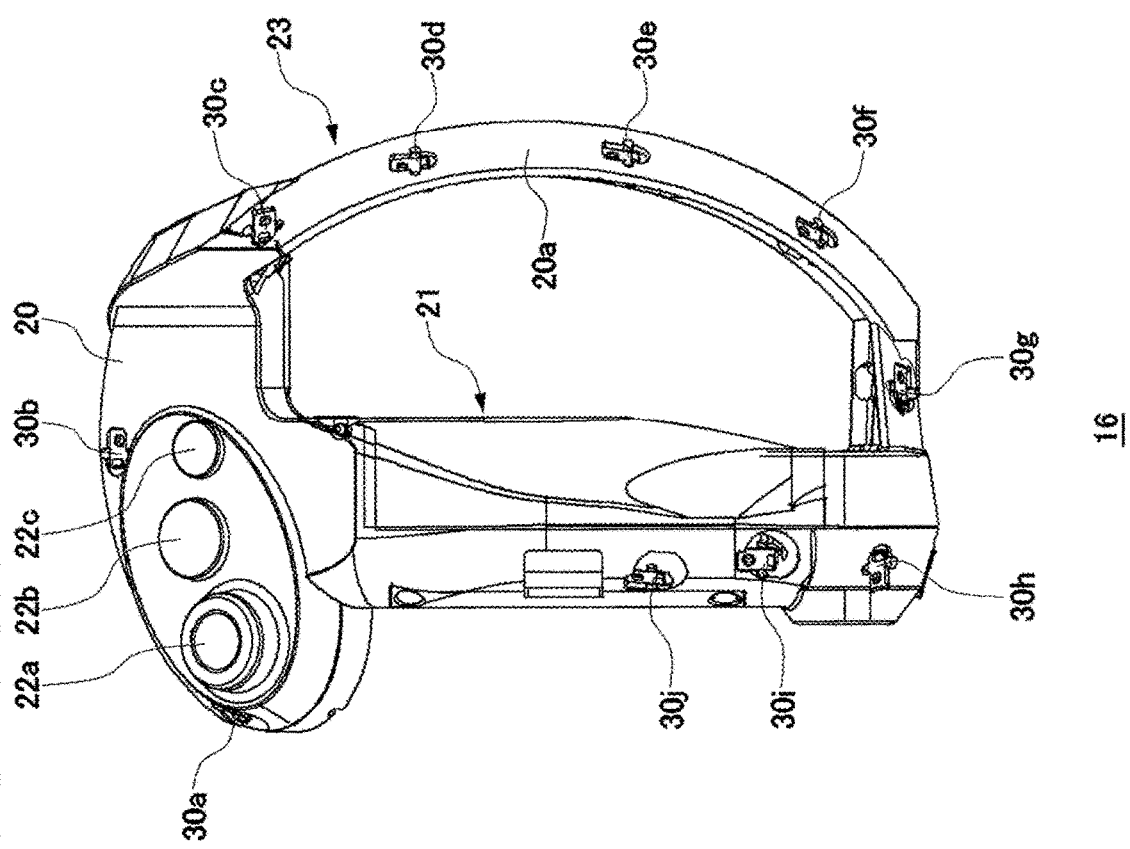

14

INFORMATION PROCESSING APPARATUS AND DEVICE INFORMATION DERIVATION METHOD

CROSS REFERENCE TO RELATED APPLICATIONS

This application claims the benefit of Japanese Priority Patent Application JP 2019-083058 filed Apr. 24, 2019, the entire contents of which are incorporated herein by reference.

BACKGROUND

The present disclosure relates to a technology for deriving position information and posture information of a device.

Japanese Patent Laid-Open No. 2007-296248 discloses a game apparatus that acquires a frame image obtained by imaging the front of the game apparatus and estimates position information and posture information of a game controller in an actual space from a position of a light emitting diode (LED) image of the game controller in the frame image. Then, the game apparatus reflects the estimated position information and/or posture information on processing of a game application.

SUMMARY

In recent years, an information processing technology of tracking a position or a posture of a device and reflecting the position or the posture on a three-dimensional (3D) model in a virtual reality (VR) space is widespread. An information processing apparatus operatively associates a movement of a player character or a game object in a game space with a change in position and posture of a device that is a tracking target to realize an intuitive operation by a user.

In order to estimate a position and a posture of a device, a plurality of light emitting markers are attached to the device. The information processing apparatus specifies coordinates of a plurality of marker images included in an image obtained by imaging the device and compares the specified coordinates with three-dimensional coordinates of the plurality of markers in a three-dimensional model of the device to estimate the position and the posture of the device in an actual space. Although increase in number of marker images to be imaged increases estimation accuracy of the position and the posture of the device, there is a problem that increase in number of marker images increases an amount of calculation.

Therefore, it is desirable to provide a technology for decreasing the amount of calculation involved in highly accurate estimation operation of a position and a posture of a device. It is to be noted that, although the device may be an inputting device having an operation button, it may otherwise be a device that becomes a target of tracking without having an operation member.

According to an embodiment of the present disclosure, there is provided an information processing apparatus including a captured image acquisition unit configured to acquire an image captured by imaging a device that includes a plurality of markers, and an estimation processing unit configured to estimate position information and posture information of the device on the basis of a marker image coordinate in the captured image. The estimation processing unit includes an extraction unit configured to extract N marker image coordinates in the captured image, N being an integer equal to or greater than three, and a position and posture derivation unit configured to derive the position information and the posture information of the device from the extracted N marker image coordinates and three-dimensional coordinates of N markers in a three-dimensional model of the device. The extraction unit extracts, where selected N+A marker image coordinates have a predetermined positional relation, N marker image coordinates from among the N+A marker image coordinates, A being an integer equal to or greater than one.

According to another embodiment of the present disclosure, there is provided a device information derivation method including acquiring an image captured by imaging a device that includes a plurality of markers, extracting N marker image coordinates in the captured image, N being an integer equal to or greater than three, and deriving position information and posture information of the device from the extracted N marker image coordinates and three-dimensional coordinates of N markers in a three-dimensional model of the device. The extracting N marker image coordinates includes extracting, where selected N+A marker image coordinates have a predetermined positional relation, N marker image coordinates from among the N+A marker image coordinates, A being an integer equal to or greater than one.

The above and other objects, features and advantages of the present disclosure will become apparent from the following description and the appended claims, taken in conjunction with the accompanying drawings in which like parts or elements are denoted by like reference symbols.

BRIEF DESCRIPTION OF THE DRAWINGS

FIGS. 4A and 4B are views depicting an appearance shape of an inputting device;

DETAILED DESCRIPTION OF THE PREFERRED EMBODIMENT

Figure 1:
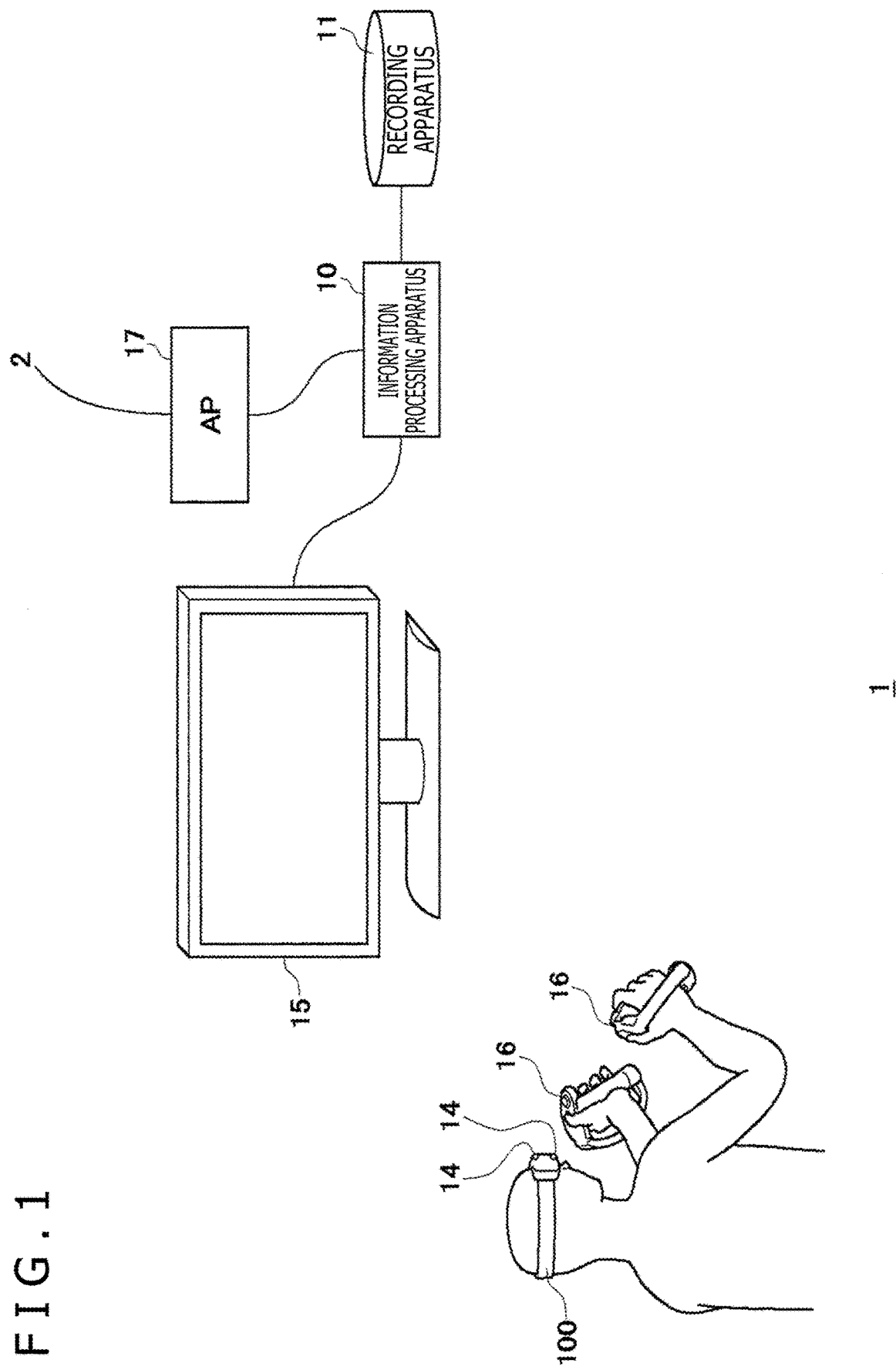
FIG. 1 is a view depicting an example of a configuration of an information processing system.

FIG. 1 depicts an example of a configuration of an information processing system according to an embodiment of the present disclosure. Referring to FIG. 1, an information processing apparatus is denoted by 1 and includes an information processing apparatus 10, a recording apparatus 11, a head-mounted display (HMD) 100, inputting devices 16 for being operated by a user with fingers of the hands, and an outputting apparatus 15 that outputs an image and sound. The outputting apparatus 15 may be a television set. The information processing apparatus 10 is connected to an external network 2 such as the Internet through an access point (AP) 17. The AP 17 has functions of a wireless access point and a router. The information processing apparatus 10 may be connected to the AP 17 by a cable or by a known wireless communication protocol.

The recording apparatus 11 records applications of system software and game software. The information processing apparatus 10 may download game software from a content server into the recording apparatus 11 through the network 2. The information processing apparatus 10 executes the game software and supplies image data and sound data of the game to the HMD 100. The information processing apparatus 10 and the HMD 100 may be connected to each other by a known wireless communication protocol or by a cable.

The HMD 100 is a display apparatus that displays an image on a display panel positioned in front of the eyes of the user when the user wears the HMD 100 on the head. The HMD 100 displays an image for the left eye on a display panel for the left eye and displays an image for the right eye on a display panel for the right eye separately from each other. The images configure parallax images viewed from left and right viewpoints to implement a stereoscopic vision. Since the user views the display panels through optical lenses, the information processing apparatus 10 corrects optical distortion of parallax image data due to the lenses and then supplies the parallax image data to the HMD 100.

Although the outputting apparatus 15 is not necessary for the user who wears the HMD 100, by preparing the outputting apparatus 15, another user can view a display image on the outputting apparatus 15. Although the information processing apparatus 10 may cause the outputting apparatus 15 to display an image same as the image being viewed by the user who wears the HMD 100, the information processing apparatus 10 may cause the outputting apparatus 15 to display another image. For example, in such a case that the user wearing the HMD 100 and another user play a game together, the outputting apparatus 15 may display a game image from a character viewpoint of the other user.

The information processing apparatus 10 and each of the inputting devices 16 may be connected to each other by a known wireless communication protocol or may be connected to each other through a cable. The inputting device 16 includes a plurality of operation members such as operation buttons, and the user would operate the operation members with its fingers while gripping the inputting device 16. When the information processing apparatus 10 executes a game, the inputting device 16 is utilized as a game controller. The inputting device 16 includes a posture sensor including a three-axis acceleration sensor and a three-axis gyro sensor and transmits sensor data in a predetermined cycle such as 1600 Hz to the information processing apparatus 10.

A game of the embodiment handles not only operation information of the operation members of the inputting device 16 but also a position, a posture, a movement, and so forth of the inputting device 16 as operation information and reflects the operation information on a movement of a player character in a virtual three-dimensional space. For example, the operation information of the operation members may be utilized as information for moving the player character, and the operation information of the position, the posture, the movement, and so forth of the inputting device 16 may be utilized as information for moving an arm of the player character. If, in a battle scene in a game, a movement of the inputting device 16 is reflected on the movement of a player character having a weapon, then an intuitive operation by the user is realized and the immersion in the game is increased.

In order to track the position and the posture of the inputting device 16, a plurality of markers as light emitting parts are provided on the inputting device 16 such that they can be imaged by an imaging device 14 incorporated in the HMD 100. The information processing apparatus 10 analyzes images obtained by imaging the inputting device 16 to estimate position information and posture information of the inputting device 16 in the actual space. The information processing apparatus 10 then provides the estimated position information and posture information to the game.

The HMD 100 has a plurality of imaging devices 14 incorporated therein. The plurality of imaging devices 14 are attached in different postures at different positions of a front face of the HMD 100 such that a totaling imaging range of imaging ranges of them includes the overall field of view of the user. It is sufficient if the imaging devices 14 are image sensors that can acquire images of the plurality of markers of the inputting device 16. For example, in a case where the markers emit visible light, the imaging devices 14 include visible light sensors that are used in a general digital video camera such as a charge coupled device (CCD) sensor or a complementary metal oxide semiconductor (CMOS) sensor. In a case where the markers emit invisible light, each imaging device 14 includes an invisible light sensor. The plurality of imaging devices 14 image the front of the user in a predetermined cycle such as 60 frames per second at synchronized timings and transmit captured image data of the inputting device 16 to the information processing apparatus 10.

The information processing apparatus 10 specifies positions of the plurality of marker images of the inputting device 16 included in the captured images. It is to be noted that, although a single inputting device 16 is sometimes imaged at a same timing by plurality of imaging devices 14, since an attachment position and an attachment posture of each imaging device 14 are known, the information processing apparatus 10 synthesizes the plurality of captured images to specify the position of each marker image.

A three-dimensional shape of the inputting device 16 and position coordinates of the plurality of markers arranged on a surface of the inputting device 16 are known, and the information processing apparatus 10 estimates the position coordinate and the posture of the inputting device 16 on the basis of a distribution of the marker images in the captured image. The position coordinate of the inputting device 16 may be a position coordinate in a three-dimensional space having an origin at a reference position. The reference position may be a position coordinate, namely, a latitude and a longitude, set before the game is started.

It is to be noted that the information processing apparatus 10 can estimate the position coordinate and the posture of the inputting device 16 also by using sensor data detected by the posture sensors of the inputting device 16. Therefore, the information processing apparatus 10 of the present embodiment may perform a tracking process of the inputting device 16 with high accuracy using both an estimation result based on the captured images captured by the imaging devices 14 and an estimation result based on the sensor data.

Figure 2:
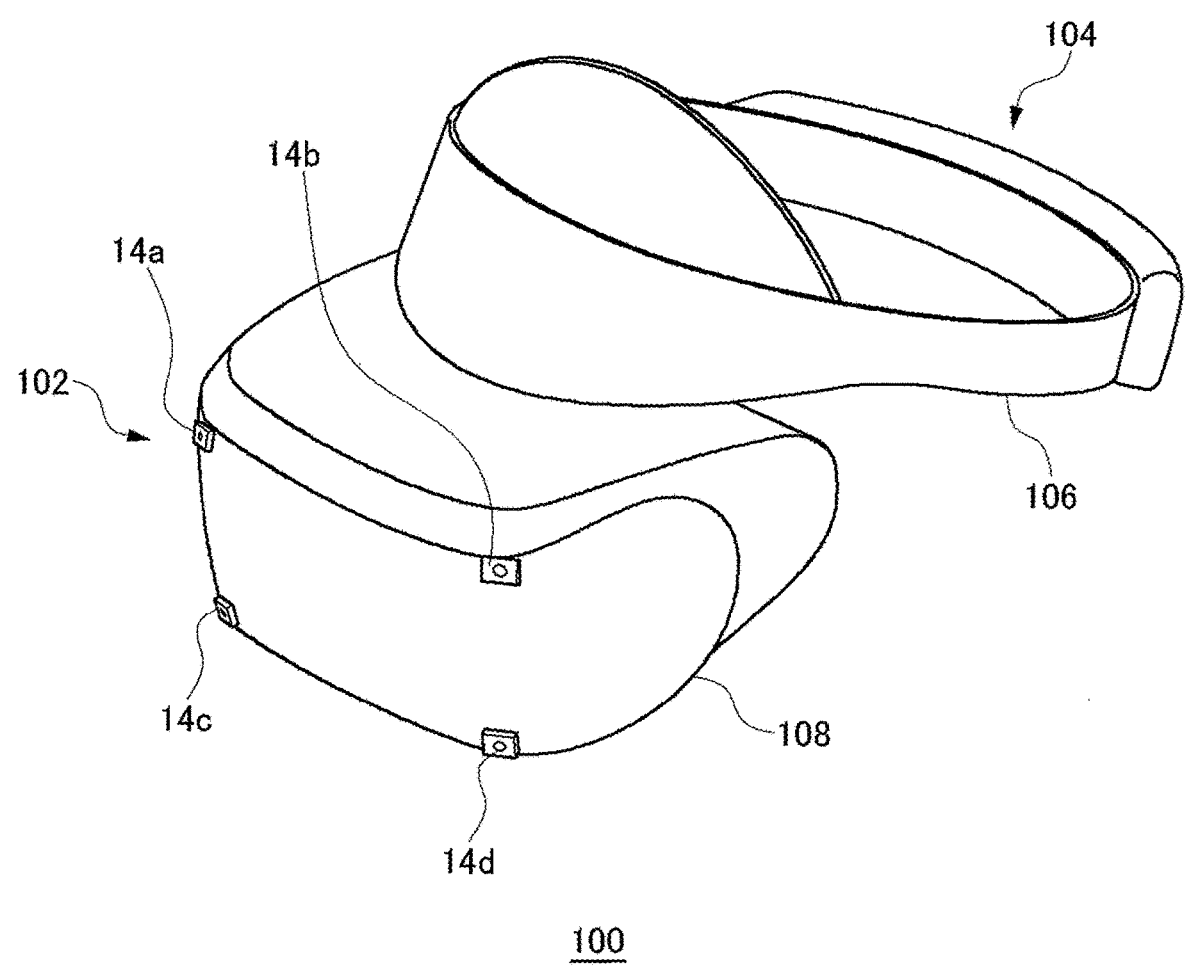
FIG. 2 is a view depicting an example of an appearance shape of an HMD.

FIG. 2 depicts an example of an appearance shape of the HMD 100. The HMD 100 includes an outputting mechanism unit 102 and a mounting mechanism unit 104. The mounting mechanism unit 104 includes a mounting band 106 that extends, when the HMD 100 is worn by the user, around the head of the user to fix the HMD 100 to the head. The mounting band 106 has a material or a structure that allows adjustment of the length in accordance with the circumference of the head of the user.

The outputting mechanism unit 102 includes a housing 108 that covers the left and right eyes in a state in which the user wears the HMD 100 and includes, in the inside thereof, a display panel that confronts the eyes when the user wears the HMD 100. The display panel may be a liquid crystal panel, an organic electroluminescence (EL) panel, or a like panel. The housing 108 further includes, in the inside thereof, a pair of left and right optical lenses that are positioned between the display panel and the eyes of the user and enlarge a viewing angle of the user. The HMD 100 may further include speakers or earphones at positions corresponding to the ears of the user, or external headphones may be connected to the HMD 100.

A plurality of imaging devices 14a, 14b, 14c, and 14d are provided on a front side outer face of the housing 108. With reference to a gaze direction of the user, the imaging device 14a is attached to an upper right corner of the front side outer face of the housing 108 such that its camera optical axis points right upward; the imaging device 14b is attached to an upper left corner of the front side outer face of the housing 108 such that its camera optical axis points left upward; the imaging device 14c is attached to a lower right corner of the front side outer face of the housing 108 such that its camera optical axis points right downward; and the imaging device 14d is attached to a lower left corner of the front side outer face of the housing 108 such that its camera optical axis points left downward. The plurality of imaging devices 14 are installed in this manner, so that the totaling imaging range of the imaging ranges of them includes the overall field of view of the user. The field of view of the user may be a field of view of the user in the three-dimensional virtual space.

The HMD 100 transmits sensor data detected by the posture sensors and image data captured by the imaging devices 14 to the information processing apparatus 10 and receives game image data and game sound data generated by the information processing apparatus 10.

Figure 3:
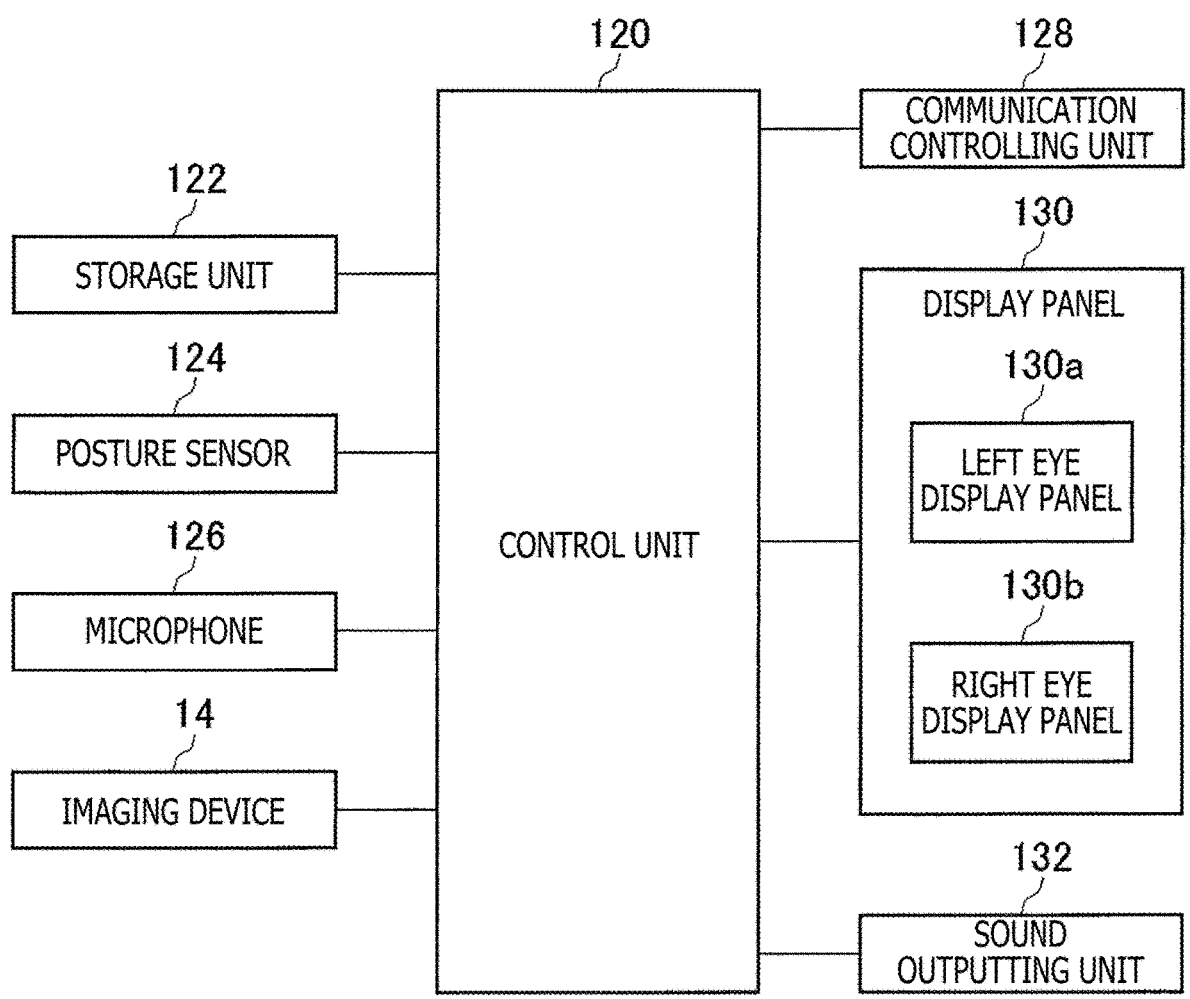
FIG. 3 is a block diagram depicting functional blocks of the HMD.

FIG. 3 depicts functional blocks of the HMD 100. Referring to FIG. 3, a control unit 120 is a main processor that processes and outputs various kinds of data such as image data, sound data, and sensor data and instructions. A storage unit 122 temporarily stores data and instructions to be processed by the control unit 120. A posture sensor 124 acquires sensor data relating to a movement of the HMD 100. The posture sensor 124 includes at least a three-axis acceleration sensor and a three-axis gyro sensor. The posture sensor 124 detects values of individual axial components, namely, sensor data, in a predetermined cycle such as 1600 Hz.

A communication controlling unit 128 transmits data outputted from the control unit 120 to the external information processing apparatus 10 by wired or wireless communication through a network adapter or an antenna. Further, the communication controlling unit 128 receives data from the information processing apparatus 10 and outputs the data to the control unit 120.

Upon receiving game image data and game sound data from the information processing apparatus 10, the control unit 120 supplies the game image data to a display panel 130 so as to be displayed on the display panel 130 and supplies the sound image data to a sound outputting unit 132 so as to be outputted as sound from the sound outputting unit 132. The display panel 130 includes a left eye display panel 130a and a right eye display panel 130b such that a pair of parallax images are displayed on the display panels. Further, the control unit 120 controls the communication controlling unit 128 to transmit sensor data from the posture sensor 124, sound data from a microphone 126, and captured image data from the imaging devices 14 to the information processing apparatus 10.

FIGS. 4A and 4B depict an appearance shape of the inputting device 16. In particular, FIG. 4A depicts a front shape of the inputting device 16 and FIG. 4B depicts a rear shape of the inputting device 16. The inputting device 16 includes a case body 20, a plurality of operation members 22a, 22b, 22c, and 22d for being operated by the user, and a plurality of markers 30a to 30t that emit light to the outside of the case body 20. In the case where the operation members 22a, 22b, 22c, and 22d are not specifically distinguished from each other, each of them is hereinafter referred to as operation member 22. Further, in the case where the markers 30a to 30t are not specifically distinguished from each other, each of them is referred to as marker 30. The operation members 22 are arranged at a head portion of the case body 20 and include an analog stick provided for tilting operation, a depression button, a trigger button for inputting a pull amount, and so forth.

The case body 20 has a grip part 21 and a curved part 23 that connects a case body head portion and a case body bottom portion to each other. The user would pass the fingers from the forefinger to the little finger between the grip part 21 and the curved part 23 and grip the grip part 21. In the state in which the user grips the grip part 21, the user would operate the operation members 22a, 22b, and 22c with the thumb and operate the operation member 22d with the forefinger. While the markers 30h, 30i, and 30j are provided on the grip part 21, they are arranged at positions at which they are not hidden by the hand even in the state in which the user grips the grip part 21. By providing one or more markers 30 on the grip part 21, estimation accuracy of the position and the posture of the inputting device 16 can be increased.

Each marker 30 is a light emitting part that emits light to the outside of the case body 20 and includes a resin portion through which light from a light source such as an LED device is diffused and emitted to the outside. The marker 30 is imaged by an imaging device 14 and utilized in an estimation process of the position and the posture of the inputting device 16. Since the imaging devices 14 image the inputting device 16 in a predetermined cycle, for example, of 60 frames per second, preferably the markers 30 emit light in synchronism with periodical imaging timings of the imaging devices 14 while it is turned off during a non-exposure period by the imaging devices 14 to suppress useless power consumption.

Figure 5:
FIG. 5 is a view depicting an example of part of an image when the inputting device is imaged.

FIG. 5 depicts an example of part of an image when the inputting device 16 is imaged. This image is a captured image of the inputting device 16 gripped by the right hand and includes images of the plurality of markers 30 that emit light. In the HMD 100, the communication controlling unit 128 transmits image data captured by the imaging devices 14 to the information processing apparatus 10 in a predetermined cycle.

Figure 6:
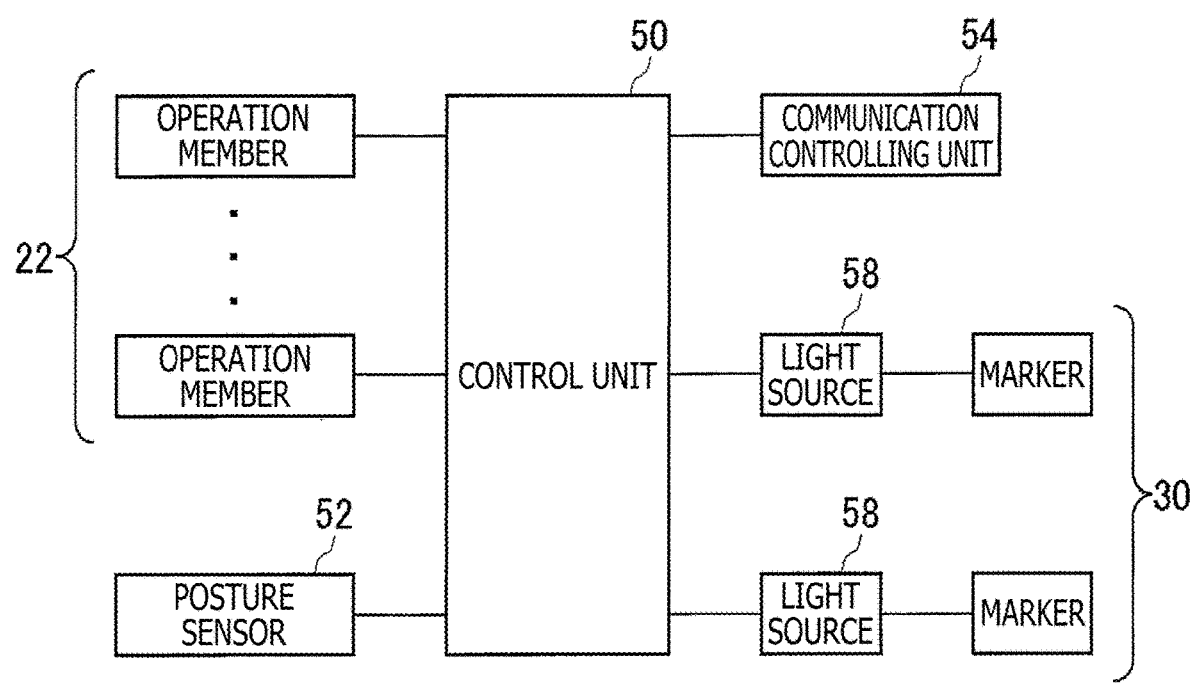
FIG. 6 is a block diagram depicting functional blocks of the inputting device.

FIG. 6 depicts functional blocks of the inputting device 16. A control unit 50 accepts operation information inputted to the operation member 22 and accepts sensor data acquired by a posture sensor 52. The posture sensor 52 acquires sensor data relating to a movement of the inputting device 16. The posture sensor 52 includes at least a three-axis acceleration sensor and a three-axis gyro sensor. The posture sensor 52 detects values of individual axial components, namely, sensor data, in a predetermined cycle such as 1600 Hz. The control unit 50 supplies the operation information and sensor data thus accepted to a communication controlling unit 54. The communication controlling unit 54 transmits the operation information and the sensor data outputted from the control unit 50 to the information processing apparatus 10 by wired or wireless communication through a network adapter or an antenna. Further, the communication controlling unit 54 acquires a light emission instruction from the information processing apparatus 10.

The inputting device 16 includes a plurality of light sources 58 for turning on the plurality of markers 30. The light sources 58 may each be an LED device that emits light of a predetermined color. The control unit 50 controls the light sources 58 on the basis of a light emission instruction acquired from the information processing apparatus 10 to emit light to turn on the markers 30.

Figure 7:
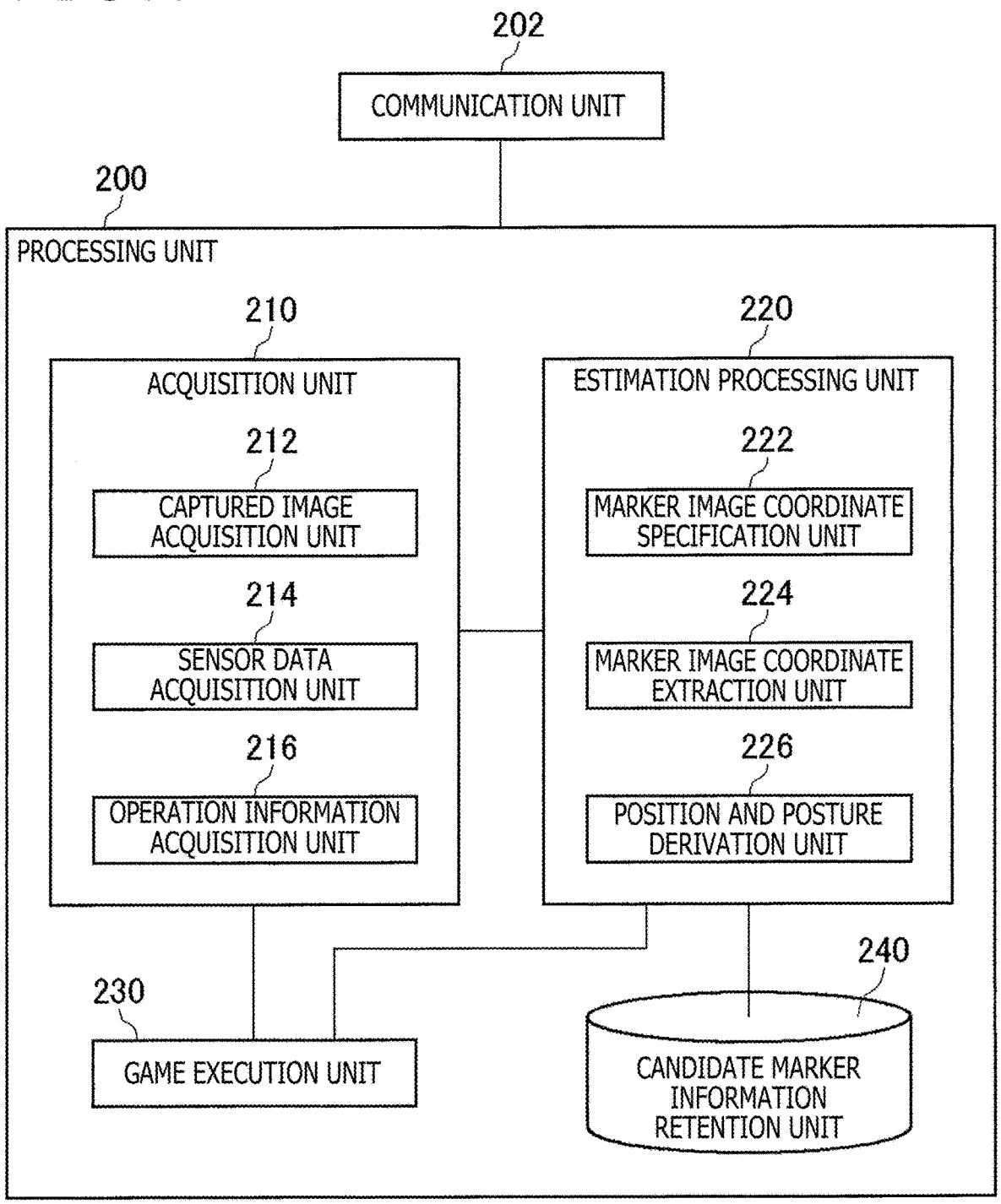
FIG. 7 is a block diagram depicting functional blocks of an information processing apparatus.
Figure 8A:
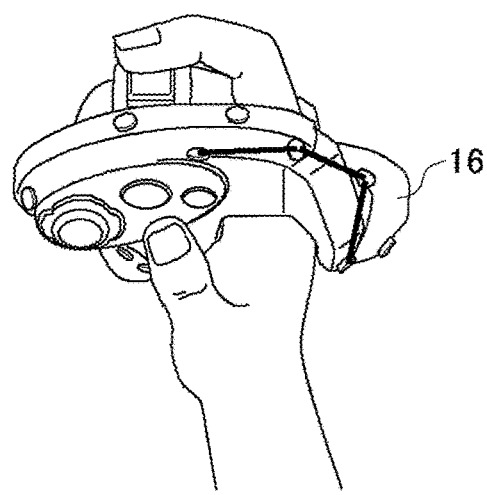
FIGS. 8A, 8B, 8C, and 8D are views depicting examples of an image obtained by imaging the inputting device.
Figure 8B:
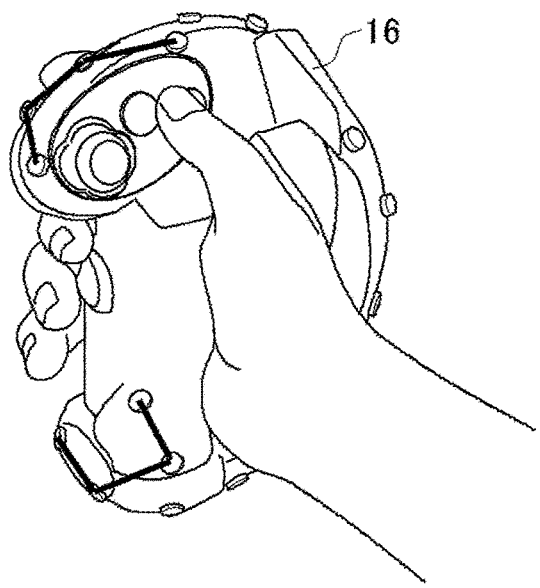
Figure 8C:
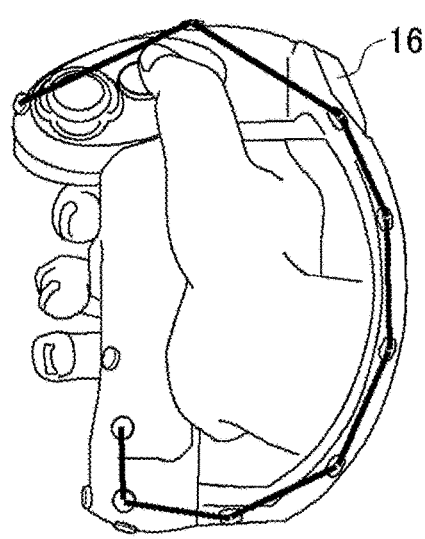
Figure 8D:
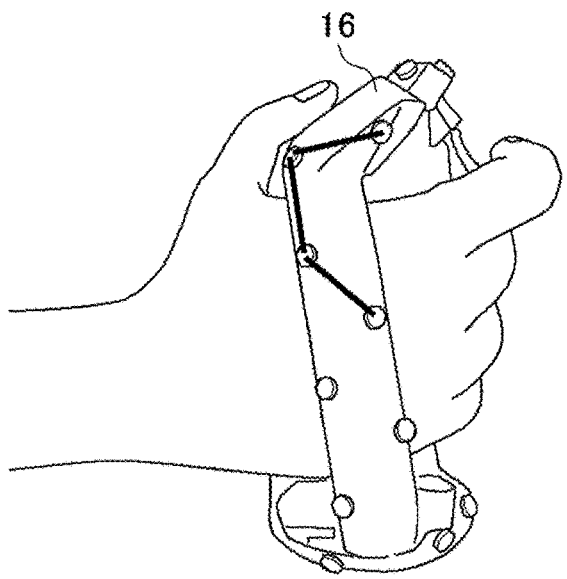

FIG. 7 depicts functional blocks of the information processing apparatus 10. Referring to FIG. 7, the information processing apparatus 10 includes a processing unit 200 and a communication unit 202. The processing unit 200 includes an acquisition unit 210, an estimation processing unit 220, a game execution unit 230, and a candidate marker information retention unit 240. The communication unit 202 receives operation information and sensor data transmitted from the inputting device 16 and supplies the operation information and the sensor data to the acquisition unit 210. Further, the communication unit 202 receives captured image data and sensor data transmitted from the HMD 100 and supplies the captured image data and the sensor data to the acquisition unit 210.

The acquisition unit 210 includes a captured image acquisition unit 212, a sensor data acquisition unit 214, and an operation information acquisition unit 216. The estimation processing unit 220 includes a marker image coordinate specification unit 222, a marker image coordinate extraction unit 224, and a position and posture derivation unit 226. The estimation processing unit 220 estimates position information and posture information of the inputting device 16 on the basis of coordinates of marker images in a captured image. The estimation processing unit 220 supplies the position information and the posture information of the inputting device 16 to the game execution unit 230.

These components can be implemented, in terms of hardware, by an arbitrary processor, a memory, and other large scale integrations (LSIs) and, in terms of software, by a program loaded in the memory and so forth. However, in FIG. 7, functional blocks implemented by cooperation of them are depicted. Accordingly, it can be recognized by those skilled in the art that the blocks can be implemented in various forms only by hardware, only by software, or by a combination of them.

The captured image acquisition unit 212 acquires a captured image of the inputting device 16 including the plurality of markers 30 and supplies the image to the estimation processing unit 220. The sensor data acquisition unit 214 acquires sensor data transmitted from the inputting device 16 and the HMD 100 and supplies the sensor data to the estimation processing unit 220. The operation information acquisition unit 216 acquires operation information transmitted from the inputting device 16 and supplies the operation information to the game execution unit 230. The game execution unit 230 proceeds with the game on the basis of the operation information and the position and posture information of the inputting device 16.

The marker image coordinate specification unit 222 specifies a two-dimensional coordinate (hereinafter referred to also as "marker image coordinate") that represents an image of each marker 30 included in a captured image. The marker image coordinate specification unit 222 may specify a region of pixels having a luminance value equal to or higher than a predetermined value and calculate and determine a gravity center coordinate of the pixel region as a marker image coordinate. At this time, the marker image coordinate specification unit 222 preferably ignores a pixel region having a shape and a size that may be impossible in regard to a marker image and calculates a gravity center coordinate of a pixel region having a shape and a size from which the pixel region can be estimated as a marker image.

As a technique for estimating, from a captured image of an object having a known three-dimensional shape and size, a position and a posture of an imaging device by which the captured image is imaged, a method of solving a perspective n-point (PNP) problem is known. In the embodiment, the marker image coordinate extraction unit 224 extracts N two-dimensional marker image coordinates in the captured image, N being an integer equal to or greater than three. Then, the position and posture derivation unit 226 derives position information and posture information of the inputting device 16 from the N marker image coordinates extracted by the marker image coordinate extraction unit 224 and three-dimensional coordinates of N markers in a three-dimensional model of the inputting device 16. The position and posture derivation unit 226 estimates a position and a posture of the imaging devices 14 using expression 1 given below and derives position information and posture information in the three-dimensional space of the inputting device 16 on the basis of a result of the estimation.

[Math 1]

$$S\begin{bmatrix} u \\ v \\ 1 \end{bmatrix} = \begin{bmatrix} f_x & 0 & 0 \\ 0 & f_y & 0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{(expression 1)}$$

Here, (u, v) is a marker image coordinate in the captured image, and (X, Y, Z) is a position coordinate in the three-dimensional space of the marker 30 when the three-dimensional model of the inputting device 16 is in a reference position and a reference posture. It is to be noted that the three-dimensional model is a model that has a shape and a size completely same as those of the inputting device 16 and has markers arranged at respective same positions. The candidate marker information retention unit 240 retains three-dimensional coordinates of the markers in the three-dimensional model that is in the reference position and the reference posture. The position and posture derivation unit 226 reads out the three-dimensional coordinates of the markers from the candidate marker information retention unit 240 to acquire the position coordinates (X, Y, Z).

In the expression 1 above, ($f_x$, $f_y$) is a focal distance of the imaging device 14 and ($c_x$, $c_y$) is an image principal point, and both of them are internal parameters of the imaging device 14. A matrix whose elements are $r_{11}$ to $r_{33}$ and $t_1$ to $t_3$ is a rotation and translation matrix. In the expression 1 above, (u, v), ($f_x$, $f_y$), ($c_x$, $c_y$), and (X, Y, Z) are known, and the position and posture derivation unit 226 solves the equation for the N markers 30 to determine a rotation and translation matrix common to them. The position and posture derivation unit 226 derives position information and posture information of the inputting device 16 on the basis of an angle and a translation amount represented by the matrix. In the embodiment, the process of estimating the position and posture of the inputting device 16 is performed by solving the PNP problem. Accordingly, the position and posture derivation unit 226 derives the position and the posture of the inputting device 16 using three marker image coordinates and three three-dimensional marker coordinates of the three-dimensional model of the inputting device 16.

The inputting device 16 of the embodiment includes 20 or more markers 30, and the number of combinations of N marker image coordinates is very great. Therefore, in the embodiment, the position and posture derivation unit 226 solves the PNP problem by executing an extraction process of N marker image coordinates using a predetermined extraction criterion and collating the extracted N marker image coordinates with a combination of the predetermined number N of three-dimensional marker coordinates. This reduces unnecessary calculation by the position and posture derivation unit 226 and realizes an estimation process with high efficiency and high accuracy.

FIGS. 8A to 8D depict examples of an image when the imaging devices 14 image the inputting device 16 from various angles. FIGS. 8A to 8D depict arrangement patterns in which, when marker images positioned close to each other are connected by a line segment and four marker images are successively connected by line segments, angles defined by adjacent line segments become obtuse angles in a same direction.

The inventors of the present disclosure actually produced a prototype of the inputting device 16 in which 23 markers 30 were arranged and checked the number of combinations of four markers 30 that might possibly be imaged such that the angles defined by adjacent line segments all became obtuse angles in a same direction. The number was 29. Naturally, the number of combinations of four markers 30 in regard to which the angles defined by adjacent line segments are all obtuse angles varies depending upon the shape of the inputting device 16 and the positions of the markers 30. In any case, four markers 30 in regard to which the angles defined by adjacent line segments are all obtuse angles are specified according to the shape of the inputting device 16 and the positions of the markers 30.

Therefore, in the present embodiment, the candidate marker information retention unit 240 retains as candidate marker information combinations of three three-dimensional coordinates from among four markers 30 in regard to which the angles defined by adjacent line segments are all obtuse angles, and the position and posture derivation unit 226 then performs calculation of the expression 1 using the candidate marker information. In the embodiment, the number of combinations of four markers 30 in regard to which the angles defined by adjacent line segments are all obtuse angles is M, and accordingly, the candidate marker information retention unit 240 retains M pieces of candidate marker information. It is to be noted that, since the inputting device 16 may be prepared for both the right hand and the left hand, the candidate marker information retention unit 240 may retain M pieces of candidate marker information for the right hand and M pieces of candidate marker information for the left hand.

Figure 9:
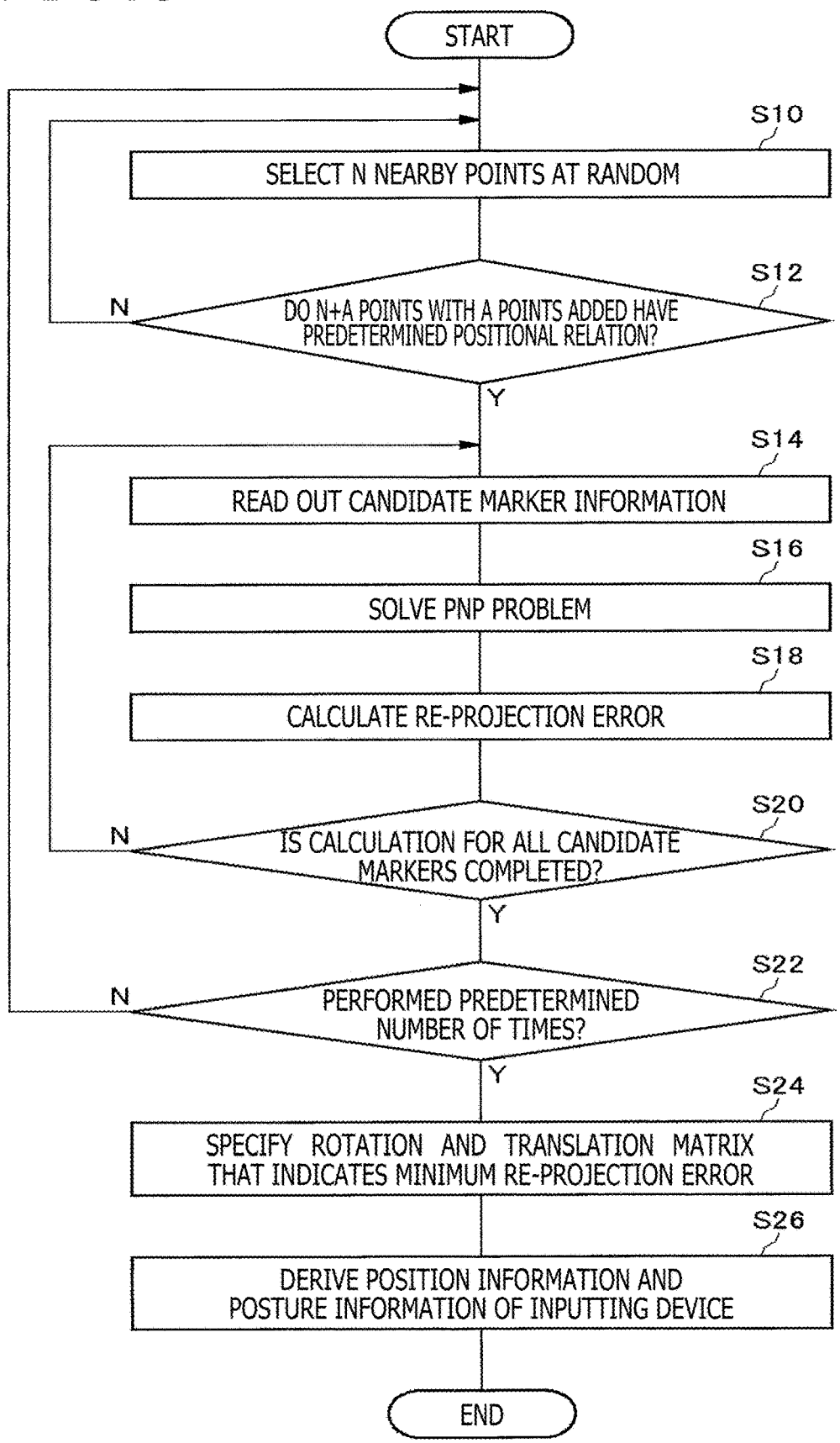
FIG. 9 is a flow chart of an estimation process by an estimation processing unit of the information processing apparatus.

FIG. 9 is a flow chart of the estimation process by the estimation processing unit 220. After the marker image coordinate specification unit 222 specifies coordinates of marker images, namely, marker image coordinates, included in a captured image, the marker image coordinate extraction unit 224 selects N marker image coordinates located close to each other at random at step S10, N being an integer equal to or greater than three. At this time, the marker image coordinate extraction unit 224 may select a coordinate of one marker image at random and specify N−1 marker image coordinates close to the selected marker image coordinate thereby to select totaling N marker image coordinates located close to each other.

Figure 10A:
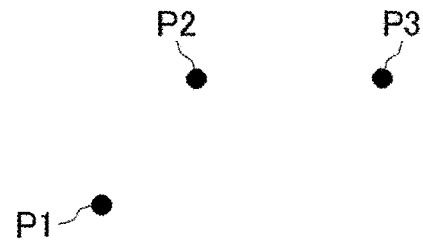
FIGS. 10A, 10B, 10C, and 10D are views depicting examples of a positional relation of marker image coordinates.

FIG. 10A depicts an example of a positional relation of selected N marker image coordinates. In the embodiment, the marker image coordinate extraction unit 224 orders the selected N marker image coordinates in the clockwise direction. In the embodiment, N=3, and the marker image coordinate extraction unit 224 defines the extracted three marker image coordinates as "first marker image coordinate P1," "second marker image coordinate P2," and "third marker image coordinate P3." It is to be noted that the ordering method is not limited to ordering in the clockwise direction. In any case, the selected three marker image coordinates are actual coordinates (u, v) inputted when the equation of the PNP problem is to be solved using it as a condition that the extraction criterion at step S12 is satisfied.

The marker image coordinate extraction unit 224 further selects A marker image coordinates, A being an integer equal to or greater than one. The marker image coordinate extraction unit 224 selects A marker image coordinates in the proximity of the third marker image coordinate P3 to which the last order number is assigned. Accordingly, the marker image coordinate extraction unit 224 selects totaling N+A marker image coordinates.

In a case where N+A marker image coordinates have a predetermined positional relation, the marker image coordinate extraction unit 224 extracts N marker image coordinates from among the N+A marker image coordinates as marker image coordinates (u, v) to be substituted into the expression 1 by the position and posture derivation unit 226. That the N+A marker image coordinates have the predetermined positional relation is defined as an extraction criterion of the N marker image coordinates by the marker image coordinate extraction unit 224.

Figure 10B:
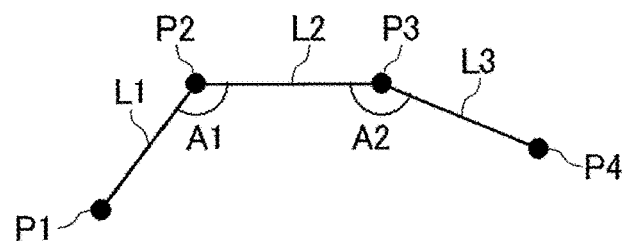

In the embodiment, A=1. The marker image coordinate extraction unit 224 checks whether the selected four marker image coordinates satisfy the extraction criterion, in other words, whether they have a predetermined positional relation. Here, the predetermined positional relation is a relation that, when the N+A marker image coordinates are connected to each other by a plurality of line segments continuing to each other, angles defined by adjacent line segments all become obtuse angles. FIG. 10B depicts an example of an arrangement pattern that satisfies the extraction criterion, and FIGS. 10C and 10D depict examples of the arrangement pattern that does not satisfy the extraction criterion.

FIG. 10B depicts an example of the arrangement pattern of the selected N+A marker image coordinates. In the following description, the fourth marker image coordinate is referred to as "fourth marker image coordinate P4." A line segment that connects the first marker image coordinate P1 and the second marker image coordinate P2 is referred to as "first line segment L1"; a line segment that connects the second marker image coordinate P2 and the third marker image coordinate P3 is referred to as "second line segment L2"; and a line segment that connects the third marker image coordinate P3 and the fourth marker image coordinate P4 is referred to as "third line segment L3." Further, an angle defined by the first line segment L1 and the second line segment L2 is referred to as "first angle A1," and an angle defined by the second line segment L2 and the third line segment L3 is referred to as "second angle A2."

In a case where the first angle A1 and the second angle A2 are obtuse angles, the marker image coordinate extraction unit 224 decides that the four marker image coordinates satisfy the extraction criterion, in other words, they have the predetermined positional relation (Y at S12). More strictly, in a case where the first angle A1 and the second angle A2 are interior angles and besides are obtuse angles in a quadrangle defined by the first line segment L1, the second line segment L2, the third line segment L3, and a line segment interconnecting the fourth marker image coordinate P4 and the first marker image coordinate P1, the marker image coordinate extraction unit 224 decides that the four marker image coordinates have the predetermined positional relation. At this time, the marker image coordinate extraction unit 224 supplies the combination of the first marker image coordinate P1, the second marker image coordinate P2, and the third marker image coordinate P3 to the position and posture derivation unit 226.

Figure 10C:
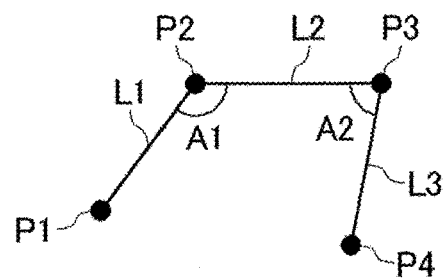
Figure 10D:
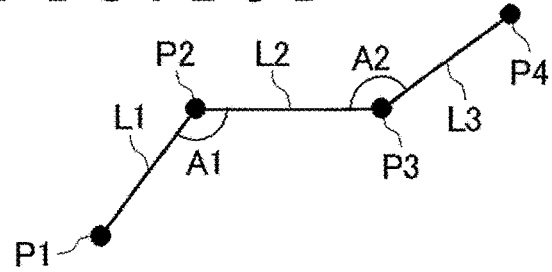

FIG. 10C depicts another example of the arrangement pattern of the selected N+A marker image coordinates. In this arrangement pattern, the second angle A2 is an acute angle, and the marker image coordinate extraction unit 224 decides that the first marker image coordinate P1, the second marker image coordinate P2, and the third marker image coordinate P3 do not satisfy the extraction criterion (N at S12). Therefore, the marker image coordinate extraction unit 224 discards the combination of the first marker image coordinate P1, the second marker image coordinate P2, and the third marker image coordinate P3 without supplying the combination to the position and posture derivation unit 226, and returns the processing to step S10, at which it selects different three marker image coordinates.

FIG. 10D depicts a further example of the arrangement pattern of the selected N+A marker image coordinates. In this arrangement pattern, although the second angle A2 is an obtuse angle, the first line segment L1, the second line segment L2, the third line segment L3, and a line segment interconnecting the fourth marker image coordinate P4 and the first marker image coordinate P1 do not form a quadrangle, or even in a case in which a quadrangle is formed, at least one of the first angle A1 and the second angle A2 does not become an interior angle. Therefore, the marker image coordinate extraction unit 224 decides that the first marker image coordinate P1, the second marker image coordinate P2, and the third marker image coordinate P3 do not satisfy the extraction criterion (N at S12). Therefore, the marker image coordinate extraction unit 224 discards the combination of the first marker image coordinate P1, the second marker image coordinate P2, and the third marker image coordinate P3 without supplying the combination to the position and posture derivation unit 226, and returns the processing to step S10, at which it selects different three marker image coordinates.

It is to be noted that the arrangement patterns depicted in FIGS. 10B to 10D assume that the first angle A1 is an obtuse angle. In a case where adjacent line segments each interconnecting two points of the first marker image coordinate P1, the second marker image coordinate P2, and the third marker image coordinate P3 cannot define an obtuse angle, the marker image coordinate extraction unit 224 discards such a combination and selects three new marker image coordinates.

There is a high possibility that the combination of the first marker image coordinate P1, the second marker image coordinate P2, and the third marker image coordinate P3 that satisfy the extraction condition corresponds to one of combinations of three three-dimensional coordinates specified with the M pieces of candidate marker information retained in the candidate marker information retention unit 240. Where the marker image coordinate extraction unit 224 extracts three pieces of marker image information having a high possibility that they match candidate marker information specified in advance using the extraction condition, an estimation process with high efficiency and high accuracy by the position and posture derivation unit 226 is realized.

The candidate marker information retention unit 240 retains, as candidate marker information, a combination of at least N three-dimensional coordinates from among the three-dimensional coordinates of N+A markers that satisfy the predetermined positional relation. As described hereinabove, the candidate marker information retention unit 240 in the embodiment retains M pieces of candidate marker information. The position and posture derivation unit 226 reads out one piece of candidate marker information from the candidate marker information retention unit 240 (S14), solves the PNP problem using the expression 1 (S16), and calculates a re-projection error (S18). The position and posture derivation unit 226 repeats the steps S14 to S18 until after calculation relating to all of the M pieces of candidate marker information retained in the candidate marker information retention unit 240 is completed (N at S20). If the position and posture derivation unit 226 calculates a re-projection error in regard to all of the M pieces of candidate marker information (Y at S20), it ends the estimation calculation for the one combination of the first marker image coordinate P1, the second marker image coordinate P2, and the third marker image coordinate P3. The position and posture derivation unit 226 performs the estimation calculation for a plurality of combinations of the first marker image coordinate P1, the second marker image coordinate P2, and the third marker image coordinate P3 (N at S22), and if the number of such combinations reaches a predetermined number (Y at S22), the position and posture derivation unit 226 specifies a rotation and translation matrix that indicates a minimum re-projection error (S24) and derives position information and posture information of the inputting device 16 (S26). The position and posture derivation unit 226 supplies the derived position information and posture information to the game execution unit 230.

It is to be noted that the estimation processing unit 220 is supplied with sensor data of the posture sensor 124 of the HMD 100 and sensor data of the posture sensor 52 of the inputting device 16 from the sensor data acquisition unit 214. The position and posture derivation unit 226 may estimate a provisional posture of the inputting device 16 using the sensor data of the posture sensors and derive, when a three-dimensional model is arranged such that the provisional posture is taken, position information and posture information of the inputting device 16 using pieces of candidate marker information that satisfy a predetermined criterion in regard to the N marker image coordinates.

When the three-dimensional model is arranged in the provisional posture, the position and posture derivation unit 226 does not read out, at step S14, those pieces of candidate marker information that are decided absolutely not to correspond to the marker image coordinates from among the M pieces of candidate marker information. This makes it possible to omit execution of steps S16 and S18 in regard to such pieces of candidate marker information.

Figure 11A:
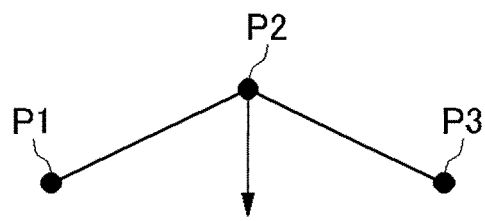
FIG. 11A is a view depicting an example of a positional relation of marker coordinates and FIG. 11B is a view depicting an example of a positional relation of N marker coordinates.
Figure 11B:
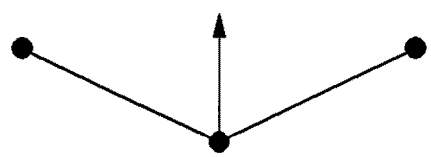

FIG. 11A depicts an example of a positional relation of N marker image coordinates. FIG. 11B depicts an example of a positional relation of N marker coordinates included in candidate marker information when a provisional posture of the inputting device 16 is estimated on the basis of sensor data and the three-dimensional model is controlled so as to have a same posture in a virtual three-dimensional space.

As depicted in FIG. 11A, the first marker image coordinate P1, the second marker image coordinate P2, and the third marker image coordinate P3 have such a positional relation that the obtuse angle is directed downward on the plane of the figure. On the other hand, the N marker coordinates have such a positional relation that the obtuse angle is directed upward on the plane of the figure.

When a vector that has a start point at a vertex of the obtuse angle and equally divides the obtuse angle is created, if an angular difference between the two vectors is equal to or greater than a predetermined angle, the position and posture derivation unit 226 may decide that the candidate marker information does not correspond to the marker image coordinate. For example, the predetermined angle may be 90 degrees, and when the angular difference between the two vectors is 90 degrees or more, the position and posture derivation unit 226 excludes the candidate marker information from a calculation target and does not read out it at step S14. In such a case as just described, since it is clear that the candidate marker information does not correspond to the marker image coordinate, the position and posture derivation unit 226 omits calculation of such candidate marker information and can thereby decrease the calculation amount.

The present disclosure has been described in connection with the embodiment. The embodiment is exemplary, and it can be recognized by those skilled in the art that various modifications are possible in regard to combinations of such components, processes, and so forth and that also such modifications fall within the scope of the present disclosure. Although, in the embodiment, the estimation process is performed by the information processing apparatus 10, the functions of the information processing apparatus 10 may be provided in the HMD 100 such that the estimation process is performed by the HMD 100.

While the foregoing description of the embodiment is directed to the arrangement of a plurality of markers 30 on the inputting device 16 that includes the operation members 22, the device to be a target of tracking may not necessarily include the operation members 22. Further, although the imaging devices 14 in the embodiment are attached to the HMD 100, it is sufficient if the imaging devices 14 can capture marker images, and the imaging devices 14 may be attached to different positions other than the HMD 100.

What is claimed is:

1. An information processing apparatus comprising:
a captured image acquisition unit configured to acquire an image captured by imaging a device that includes a plurality of markers; and
an estimation processing unit configured to estimate position information and posture information of the device on a basis of a marker image coordinate in the captured image; wherein
the estimation processing unit includes
an extraction unit configured to extract N marker image coordinates in the captured image, N being an integer equal to or greater than three, and
a position and posture derivation unit configured to derive the position information and the posture information of the device from the extracted N marker image coordinates and three-dimensional coordinates of N markers in a three-dimensional model of the device, and
the extraction unit extracts, where selected N+A marker image coordinates have a predetermined positional relation, N marker image coordinates from among the N+A marker image coordinates, A being an integer equal to or greater than one,
wherein the predetermined positional relation is such that a first line segment interconnecting a first marker image coordinate and a second marker image coordinate and a second line segment interconnecting the second marker image coordinate and a third marker image coordinate define a first obtuse angle therebetween, the second line segment and a third line segment interconnecting the third marker image coordinate and a fourth marker image coordinate define a second obtuse angle therebetween, and the first obtuse angle and the second obtuse angle are interior angles of a quadrangle defined by the first line segment, the second line segment, the third line segment, and a line segment that interconnects the fourth marker image coordinate and the first marker image coordinate.

2. The information processing apparatus according to claim 1, wherein the predetermined positional relation is a relation that, when the N+A marker image coordinates are connected to each other by a plurality of line segments continuing to each other, all of angles defined by adjacent ones of the line segments are obtuse angles.

3. The information processing apparatus according to claim 1, further comprising:
a candidate marker information retention unit configured to retain as candidate marker information a combination of at least N three-dimensional coordinates from among three-dimensional coordinates of N+A markers that satisfy a predetermined positional relation, wherein
the position and posture derivation unit derives the position information and the posture information of the device using the N marker image coordinates extracted by the extraction unit and three-dimensional coordinates of N markers included in the candidate marker information.

4. The information processing apparatus according to claim 3, further comprising:
a sensor data acquisition unit configured to acquire sensor data of a posture sensor of the device, wherein
the position and posture derivation unit estimates a provisional posture of the device using the sensor data of the posture sensor of the device, and derives the position information and the posture information of the device using candidate marker information that satisfies, when the three-dimensional model is arranged so as to have the estimated provisional posture of the device, a predetermined criterion for the N marker image coordinates.

5. A device information derivation method comprising:
acquiring an image captured by imaging a device that includes a plurality of markers;
extracting N marker image coordinates in the captured image, N being an integer equal to or greater than three; and
deriving position information and posture information of the device from the extracted N marker image coordinates and three-dimensional coordinates of N markers in a three-dimensional model of the device;
the extracting N marker image coordinates including extracting, where selected N+A marker image coordinates have a predetermined positional relation, N marker image coordinates from among the N+A marker image coordinates, A being an integer equal to or greater than one, wherein the predetermined positional relation is such that a first line segment interconnecting a first marker image coordinate and a second marker image coordinate and a second line segment interconnecting the second marker image coordinate and a third marker image coordinate define a first obtuse angle therebetween, the second line segment and a third line segment interconnecting the third marker image coordinate and a fourth marker image coordinate define a second obtuse angle therebetween, and the first obtuse angle and the second obtuse angle are interior angles of a quadrangle defined by the first line segment, the second line segment, the third line segment, and a line segment that interconnects the fourth marker image coordinate and the first marker image coordinate.

6. A non-transitory computer readable medium having stored thereon a program for a computer, comprising:
by a captured image acquisition unit, acquiring an image captured by imaging a device that includes a plurality of markers;
by an extraction unit, extracting N marker image coordinates in the captured image, N being an integer equal to or greater than three; and
by a position and posture derivation unit, deriving position information and posture information of the device from the extracted N marker image coordinates and three-dimensional coordinates of N markers in a three-dimensional model of the device;
the extracting N marker image coordinates including extracting, where selected N+A marker image coordinates have a predetermined positional relation, N marker image coordinates from among the N+A marker image coordinates, A being an integer equal to or greater than one,
wherein the predetermined positional relation is such that a first line segment interconnecting a first marker image coordinate and a second marker image coordinate and a second line segment interconnecting the second marker image coordinate and a third marker image coordinate define a first obtuse angle therebetween, the second line segment and a third line segment interconnecting the third marker image coordinate and a fourth marker image coordinate define a second obtuse angle therebetween, and the first obtuse angle and the second obtuse angle are interior angles of a quadrangle defined by the first line segment, the second line segment, the third line segment, and a line segment that interconnects the fourth marker image coordinate and the first marker image coordinate.

7. An information processing apparatus comprising:
a captured image acquisition unit configured to acquire an image captured by imaging a device that includes a plurality of markers;
an estimation processing unit configured to estimate position information and posture information of the device on a basis of a marker image coordinate in the captured image; wherein
the estimation processing unit includes
an extraction unit configured to extract N marker image coordinates in the captured image, N being an integer equal to or greater than three, and
a position and posture derivation unit configured to derive the position information and the posture information of the device from the extracted N marker image coordinates and three-dimensional coordinates of N markers in a three-dimensional model of the device, and
the extraction unit extracts, where selected N+A marker image coordinates have a predetermined positional relation, N marker image coordinates from among the N+A marker image coordinates, A being an integer equal to or greater than one;
a candidate marker information retention unit configured to retain as candidate marker information a combination of at least N three-dimensional coordinates from among three-dimensional coordinates of N+A markers that satisfy a predetermined positional relation,
wherein the position and posture derivation unit derives the position information and the posture information of the device using the N marker image coordinates extracted by the extraction unit and three-dimensional coordinates of N markers included in the candidate marker information; and
a sensor data acquisition unit configured to acquire sensor data of a posture sensor of the device,
wherein the position and posture derivation unit estimates a provisional posture of the device using the sensor data of the posture sensor of the device, and derives the position information and the posture information of the device using candidate marker information that satisfies, when the three-dimensional model is arranged so as to have the estimated provisional posture of the device, a predetermined criterion for the N marker image coordinates.

* * * * *